United States Patent [19]

Teske

[11] Patent Number: 4,492,508
[45] Date of Patent: Jan. 8, 1985

[54] BULK-STORAGE APPARATUS WITH UNLOADER

[76] Inventor: Lothar Teske, Hegelstr. 15, D-5000 Köln, Fed. Rep. of Germany

[21] Appl. No.: 386,594

[22] Filed: Jun. 9, 1982

[30] Foreign Application Priority Data

Jun. 26, 1981 [DE] Fed. Rep. of Germany ....... 3125110

[51] Int. Cl.³ .............................................. B65G 65/48
[52] U.S. Cl. .................................... 414/304; 222/411
[58] Field of Search .............................. 414/304–306, 414/325; 222/411

[56] References Cited

U.S. PATENT DOCUMENTS 4,396,337 8/1983 Johanning ........................... 414/304

FOREIGN PATENT DOCUMENTS 2938165 2/1981 Fed. Rep. of Germany .

Primary Examiner—Robert G. Sheridan
Attorney, Agent, or Firm—Karl F. Ross; Herbert Dubno

[57] ABSTRACT

A bulk-storage apparatus has a large hopper adapted to hold a large supply of bulk material and having a floor formed with a central outlet opening centered on a vertical axis and a side wall extending upward from the floor. An upwardly tapered hood generally centered on the axis and open downwardly toward the opening has a lower edge vertically spaced from the floor around the opening. A drive supported in the hood has a rotary output projecting down into the space between the floor and the lower edge above the opening and carries an arm sweepable over the floor around the opening by the drive. The hood is supported in the hopper on at least one tubular traverse having an inner end secured to and opening into the hood and an outer end secured to and opening outside the hopper. This traverse is of a cross-sectional size big enough that a man can crawl between outside the hopper and inside the hood along the traverse. An openable cover closes the traverse between its ends. Thus the drive in the hood is accessible through the tubular traverse so that a man crawl through the traverse into the hood to service the drive while the hopper is full.

17 Claims, 4 Drawing Figures

BULK-STORAGE APPARATUS WITH UNLOADER

FIELD OF THE INVENTION

The present invention relates to a bulk-storage apparatus. More particularly this invention concerns such an apparatus which is provided with an unloader.

BACKGROUND OF THE INVENTION

A standard bulk-storage apparatus has a large hopper adapted to hold a large supply of bulk material and having a floor formed with a central outlet opening centered on a vertical axis and a side wall extending upward from the floor. An upwardly tapered hood generally centered on the axis and open downwardly toward the opening has a lower edge vertically spaced from the floor around the opening. A drive supported in the hood has a rotary output projecting down into the space between the floor and the lower edge above the opening and carries an arm sweepable over the floor around the opening by the drive.

Thus, as the drive orbits the arm, bulk material is swept into the central opening, to fall down through an outlet tube to an appropriate horizonal conveyor or the like. Such an arrangement can be used with coal, grain, ore, or the like, and is typically employed with dusty materials. It is not uncommon for such arrangements to be very large, with a rotor some 3 m in diameter.

The drive must, of course, be serviced periodically. As a rule this is done when the hopper is empty, so cover plates in the sides of the uncovered hood can be removed to gain access to the drive in its interior. Obviously this exposes the worker to whatever dust or the like is left over from the material that hitherto filled the hopper. In addition it requires that the hopper be run empty, which is not advisable in many systems and production operations.

A system breakdown is much more serious. To make repairs the hopper must be emptied to allow the service people to gain access to the drive. This can be an extremely onerous job requiring shoveling or vacuuming the material out of the hopper. Days of down time can be wasted just emptying out the hopper so the necessary repairs can be made. This is particularly irksome when only the repair needed is a relatively minor one.

OBJECTS OF THE INVENTION

It is therefore an object of the present invention to provide an improved bulk-storage apparatus.

Another object is the provision of such a bulk-storage apparatus which overcomes the above-given disadvantages.

Yet another object is to provide a bulk-storage apparatus which can be serviced easily, even while the hopper is full.

SUMMARY OF THE INVENTION

These objects are attained according to the instant invention in an apparatus of the general type described above, but wherein the hood is supported in the hopper on at least one tubular traverse having an inner end secured to and opening into the hood and an outer end secured to and opening outside the hopper. This traverse is of a cross-sectional size big enough that a man can crawl between outside the hopper and inside the hood along the traverse. An openable cover closes the traverse between its ends. Thus the drive in the hood is accessible through the tubular traverse so that a man can crawl through the traverse into the hood to service the drive while the hopper is full.

According to another feature of this invention the drive motor is of smaller horizontal cross section than the opening and the apparatus has means for vertically displacing the drive through the opening. This means includes a pulley fixed in the hood on the axis above the drive. Thus it is possible to lower the drive out through the outlet opening, with the service people working through the traverse or two such traverses. To this end the vertical-displacement means can include a flexible element passing along the traverse, over the pulley, and down from the pulley to the drive.

In order to prevent the relatively large traverse or traverses from blocking flow down in the hopper, they are upwardly peaked and pointed. They may also according to this invention be of round vertical cross section. If appropriately shaped the traverses can be relatively large without blocking flow down in the hopper.

According to another feature of this invention the arm extends radially in the hopper well beyond the hood and opening It is secured thereto releasably, by bolts or the like operable from above, so that this arm can be disattached from the drive from inside the hood, left if necessary engaged in the bulk material still in the hopper.

The hood in accordance with this invention has an intermediate radially inwardly projecting wall having an inner periphery spaced radially outwardly of the drive. Means, such as bolts operable from above, secures the drive to this intermediate wall. In this manner the hood and intermediate wall form a compartment connected to the closed interior of the traverse, so that the drive is well shielded from dust.

Normally according to this invention the inner periphery also defines an opening large enough for a man to pass through. The means for securing the drive to the intermediate wall includes an attachment ring surrounding the drive and means for attaching the ring to the drive and to the intermediate wall. In addition this means for attaching includes bolts engageable from above through the drive and intermediate wall with the ring. To give access to the bolts securing the sweep arm, the ring is formed by an annular succession of ring segments. Thus one segment can be removed to leave a hole large enough to reach through and operate the wrench for removing the sweep arm. When all the ring segments and the drive are removed, a hole is left in this intermediate wall that a man can pass through, thereby eliminating the necessity of a manhole and cover here too.

In addition according to this invention the hood has a cylindrical lower wall portion having a vertically displaceable lower edge. This is done by providing the cylindrical lower wall portion with a plurality of individually vertically adjustable wall sections. These wall sections are formed by respective flat plates releasably held in place by respective bolts. The plates, which are subject to enormous abrasion so that they have a very short service life and are relatively easy to replace therefore.

In accordance with another feature of this invention the apparatus has an outlet tube extending downward from the floor around the opening and having a removable section of an overall height greater than the overall height of the drive. Thus this section can be removed and the drive can be lowered out through the outlet opening and removed laterally where the tube section was taken out. The entire drive can therefore be repalaced relatively easily even when the hopper is full. The feed lines, normally hydraulic, for the drive extend out through one of the traverses.

DESCRIPTION OF THE DRAWING

The above and other features and advantages will become more readily apparent from the following, reference being made to the accompanying drawing in which.

SPECIFIC DESCRIPTION

A hopper 1 according to this invention has a side wall whose lower portion 2 is cylindrical and centered on a vertical axis A. A planar floor perpendicular to this axis A seals off the bottom of this wall portion 2 and is formed centered on the axis A with a throughgoing circular hole 4 of diameter D. Thus the hopper 1 is an upwardly open vessel apporoximately 3 m in diameter at the portion 2.

Figure 1:
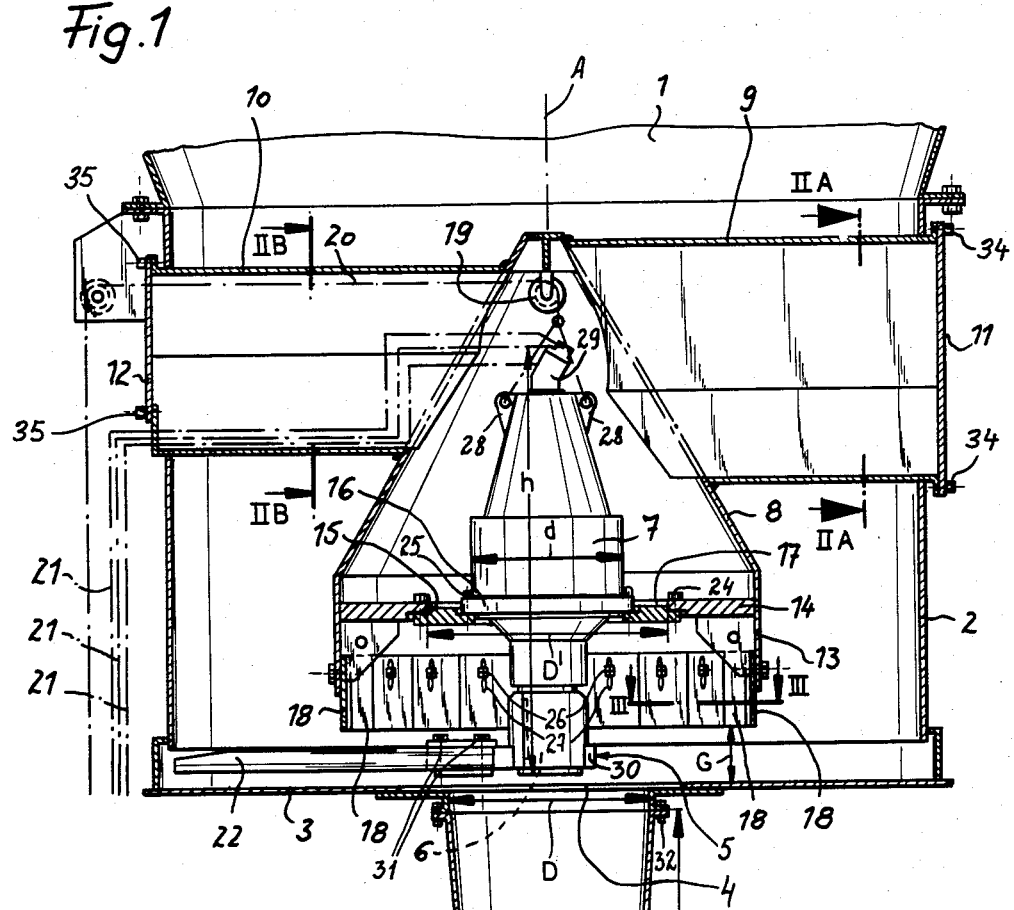
FIG. 1 is a vertical section through the apparatus according to this invention.
Figure 2A:
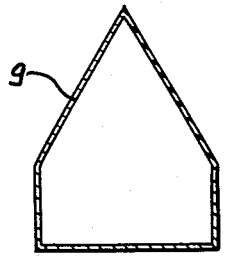
FIGS. 2A, 2B, and 3 are sections taken respectively along lines IIA—IIA, IIB—IIB, and III—III of FIG. 1.
Figure 2B:
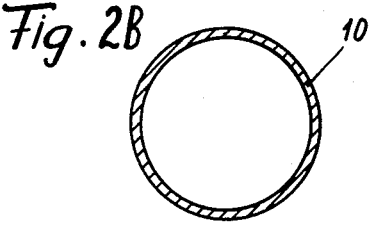
Figure 3:
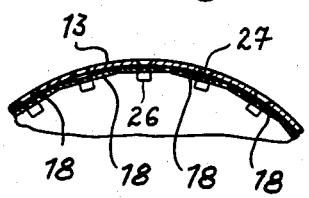

A feed rotor 5 is carried on a shaft 6 for rotation about the axis A by means of a drive 7 suspended in an upwardly tapered or pointed frustoconical hood 8 also centered on this axis A. A pair of diametrically opposite tubular traverses 9 and 10 have inner ends fixed on and opening into the hood 8 and outer ends extending through the side wall 2 and sealed by respective covers 11 and 12 held in place by screws 34 and 35. The traverse 9 is as shown in FIG. 2A of pentagonal section, having an uwwardly directed roof-like point so that bulk material inside the hopper 1 will flow past it easily. This traverse 9 is about 1 m high inside so that a man can easily crawl along it. The other traverse 10 is a little smaller, but still big enough to crawl through. It is as shown in FIG. 2B of circular cross section.

The hood 8 has a cylindrical lower wall portion 13 centered on the axis A and provided with an inwardly extending wall or rim 14 having an inner edge 15 with a diameter D' slightly greater than the diameter D and sufficiently large for a man to pass through if necessary. The drive 7 has a radially outwardly projecting flange 15 that is secured to the rim 14 by means of an annular connector element 17. Bolts 24 secure the outer periphery of the element 17 to the rim 14 and bolts 25 secure the inner periphery to the flange 16. These bolts 24 and 25 have their heads on the top so that they can be unscrewed from above inside the hood 8. The element 17 hay be formed of a succession of segments so that a person who has gained access to the interior of the hood 8 through the traverse 9 or 10 can reach down past these elements or through them.

The lowermost region of the hood 8 is formed by an annular array of flat plates 18 formed with vertically elongated slots 26 in which engage respective bolts 27 screwed into the wall portion 13. Thus the plates 8 can be removed, leaving enough space under the edge of the wall portion 13 for a man to pass if necessary. In addition these plates 18 can be raised or lowered to adjust the height of the gap G between the lower edge of te hood 8 and the top of the floor 3.

The flattened point at the top of the hood 8 is provided internally with a pulley or block 19 over which is reeved a cable 20 that can extend out through the tubular traverse 10, when its cover 12 is off, and which is connected to eyes 28 at the top of the drive 7, which normally has a hydraulic motor 29 connected through stepdown gearing to the rotor 5. Other supply lines 21 also extend normally through the cover 12 to the motor 29.

The rotor 5 includes one or more arms 22 secured to a flange 30 of the drive 7 by means of bolts 31 that screw in axially from above. Thus as the rotor 6 turns about the axis A the arm 22 will sweep bulk material along the floor 3 radial in to the opening 4, substantially as described in German patent document No. 2,938,165.

The floor 3 is provided around the opening 4 with a downwardly extending outlet tube 23 that terminates in an airtight manner in a closed horizontal scraper-type conveyor. Bolts 32 secure the tube 23 to the floor 3 and bolts 33 to the conveyor 24, These bolts 32 and 33 are wholly accessible from outside the unit. The tube 23 has an overall height H which is slightly greater than the height h of the drive 7.

Assuming the worst possible failure of the above-described system, irreparable breadkown of the drive 7 caused by a jammed and broken arm 22, it is possible to make the necessary repairs without emptying the hopper. This is done as follows:

First the covers 11 and 12 are removed. The cable 20 is connected to the drive 7 and is put under tension by someone working through the traverse 10. A worker gaining access through the other traverse can then unbolt the connector ring 17 and then the arm 22, completely freeing the drive 7.

Meanwhile the bolts 32 and 33 are withdrawn and the tube section 23 is taken out. The cable 20 is then used to lower the entire drive unit 7 out through the hole 4, whose diameter D is substantially greater than the maximum diameter d of the drive 7 at the flange 16. Since the drive unit 7 is shorter than the tube 23, it can be laterally taken away from the space the removal of this tube creates.

Once the drive 7 is out of the way it is possible to reposition any of the plates 18 from within, as well as to remove one or more of these plates to gain access to the base of the hopper 1 to remove a blockage or the broken arm 22. A new arm 22 can be pushed in under the bulk material, and a new drive unit 7 connected to the lines 21 can be hauled back up into the unit by the cable 20. The new arm 22 is bolted on and the ring 17 bolted back in place to secure the drive unit 7 back in place. Then the covers 11 and 12 are closed by the bolts 34 and 35 and the tube 23 is secured back in place by the bolts 32 and 33 to seal the system up again.

Thus with the system of this invention it is not necessary to empty the hopper to service its unloader. In fact regular maintanence, such as lubrication of its bearings, can be carried out without even shutting the system down, although normally the dust created by such operation is so great as to make such servicing inadvisable. Nonetheless the interior of the hood 8 above the wall 14 is closed off from the interior of the hopper 1 so that it is normally not dusty therein.

I claim:

1. A bulk-storage apparatus comprising:
   a large hopper adapted to hold a large supply of bulk material and having a floor formed with a central outlet opening defining a vertical axis and a side wall extending upward from said floor;

an upwardly tapered hood generally centered on said axis and open downwardly toward said opening, said hook having a lower edge vertically spaced from said floor around said opening;

at least one tubular traverse supporting said hood in said hopper and having an inner end secured to and opening into said hood and an outer end secured to and opening outside said hopper, said traverse being of a cross-sectional size big enough that a man can crawl between outside said hopper and inside said hood along said traverse;

an openable cover closing said traverse between said ends;

a drive motor supported in said hood and accessible through said tubular traverse, said drive having a rotary output projecting down into the space between said floor and said lower edge above said opening, whereby a man can crawl through said traverse into said hood to service said drive while said hopper is full, said drive motor being of smaller horizontal cross section than said opening;

means for vertically displacing said drive through said opening; and an arm carried on said output and sweepable over said floor around said opening by said drive.

2. The bulk-storage apparatus defined in claim 1 wherein said means for vertically displacing includes a pulley fixed in said hood on said axis above said drive.

3. The bulk-storage apparatus defined in claim 2 wherein said means for vertically displacing includes a flexible element passing along said traverse, over said pulley, and down from said pulley to said drive.

4. The bulk-storage apparatus defined in claim 1 wherein said traverse is upwardly peaked and pointed.

5. The bulk-storage apparatus defined in claim 1 wherein said traverse is of round vertical cross section.

6. The bulk-storage apparatus defined in claim 1 wherein said arm extends radially in said hopper well beyond said hood and opening.

7. The bulk-storage apparatus defined in claim 6, further comprising means for releasably securing said arm to said output.

8. A bulk-storage apparatus comprising:

a large hopper adapted to hold a large supply of bulk material and having a floor formed with a central outlet opening defining a vertical axis and a side wall extending upward from said floor;

an upwardly tapered hood generally centered on said axis and open downwardly toward said opening, said hood having a lower edge vertically spaced from said floor around said opening;

at least one tubular traverse supporting said hood in said hopper and having an inner end secured to and opening into said hood and an outer end secured to and opening outside said hopper, said traverse being of a cross-sectional size big enough that a man can crawl between outside said hopper and inside said hood along said traverse;

an openable cover closing said traverse between said ends;

a drive supported in said hood and accessible through said tubular traverse, said drive having a rotary output projecting down into the space between said floor and said lower edge above said opening, whereby a man can crawl through said traverse into said hood to service said drive while said hopper is full, said hood having an intermediate radially inwardly projecting wall having an inner periphery spaced radially outwardly of said drive;

means for securing said drive to said intermediate wall; and an arm carried on said output and sweepable over said floor around said opening by said drive.

9. The bulk-storage apparatus defined in claim 8 wherein said inner periphery defines an opening large enough for a man to pass through.

10. The bulk-storage apparatus defined in claim 8 wherein said means for securing said drive to said intermediate wall includes an attachment ring surrounding said drive and means for attaching said ring to said drive and to said intermediate wall.

11. The bulk-storage apparatus defined in claim 10 wherein said means for attaching includes bolts engageable from above through said drive and intermediate wall with said ring.

12. The bulk-storage apparatus defined in claim 10 wherein said ring is formed by an annular succession of ring segments.

13. A bulk-storage apparatus comprising:

a large hopper adapted to hold a large supply of bulk material and having a floor formed with a central outlet opening defining a vertical axis and a side wall extending upward from said floor;

an upwardly tapered hood generally centered on said axis and open downwardly toward said opening, said hood having a lower edge vertically spaced from said floor around said opening, said hood having a cylindrical lower wall portion having a vertically displaceable lower edge;

at least one tubular traverse supporting said hood in said hopper and having an inner end secured to and opening into said hood and an outer end secured to and opening outside said hopper, said traverse being of a cross-sectional size big enough that a man can crawl between outside said hopper and inside said hood along said traverse;

an openable cover closing said traverse between said ends;

a drive supported in said hood and accessible through said tubular traverse, said drive having a rotary output projecting down into the space between said floor and said lower edge above said opening, whereby a man can crawl through said traverse into said hood to service said drive while said hopper is full; and an arm carried on said output and sweepable over said floor around said opening by said drive.

14. The bulk-storage apparatus defined in claim 13 wherein said cylindrical lower wall portion has a plurality of individually vertically adjustable wall sections.

15. The bulk-storage apparatus defined in claim 14 wherein said cylindrical lower wall portion has a respective flat plates forming said sections and respective bolts releasably securing said plates in place on said hood.

16. The bulk-storage apparatus defined in claim 1, further comprising an outlet tube extending down from said floor around said opening and having a removable section of an overall height greater than the overall height of said drive, said drive motor being of smaller horizontal cross section than said opening, said apparatus further comprising means for vertically displacing said drive through said opening down into said outlet tube.

17. The bulk-storage apparatus defined in claim 1 wherein said hood is upwardly pointed.

* * * * *